United States Patent [19]
Woodnorth et al.

[11] Patent Number: 5,931,333
[45] Date of Patent: Aug. 3, 1999

[54] CONTAINER SYSTEM INCLUDING A COLANDER

[75] Inventors: Brian E. Woodnorth; Johannes N. Gaston; Douglas J. Van Ornum, all of Minneapolis, Minn.

[73] Assignee: Anchor Hocking Plastics/Plastics Inc., St. Paul, Minn.

[21] Appl. No.: 08/775,492

[22] Filed: Dec. 31, 1996

[51] Int. Cl.⁶ ...................................................... B65D 1/34
[52] U.S. Cl. ................................ 220/573.4; 220/367.1; 220/DIG. 27; 220/913; 220/256
[58] Field of Search ............................. 220/573.4, 367.1, 220/756, DIG. 27, 913

[56] References Cited

U.S. PATENT DOCUMENTS

| | | | |
|---|---|---|---|
| 1,698,914 | 1/1929 | Kircher | 220/573.4 |
| 4,106,486 | 8/1978 | Lee | 220/573.4 |
| 4,164,174 | 8/1979 | Wallsten | 220/573.4 |
| 4,186,217 | 1/1980 | Tchack | 220/573.4 |
| 4,373,511 | 2/1983 | Miles et al. | 220/573.4 |
| 4,574,776 | 3/1986 | Hidle | 220/573.4 |
| 4,604,989 | 8/1986 | Kita | 220/573.4 |
| 5,356,026 | 10/1994 | Andress et al. | |

Primary Examiner—Joseph M. Moy
Attorney, Agent, or Firm—Rockey, Milnamow & Katz, Ltd.

[57] ABSTRACT

A container system is optimized for use as a microwave steamer. The container system includes a container, a lid, and a colander disposed between the lid and the container. The colander has smooth sides and integral hand grips. The integral hand grips vent vapor trapped between the colander and the container and allow easy lifting of the colander from the container. The colander also includes slot-like longitudinal openings on a side wall. Additionally, the lid includes a vent aperture which is a grate that prevents spattering of liquids from the container system. The lid is sealably engaged to the opening of the container.

20 Claims, 6 Drawing Sheets

FIG. 7
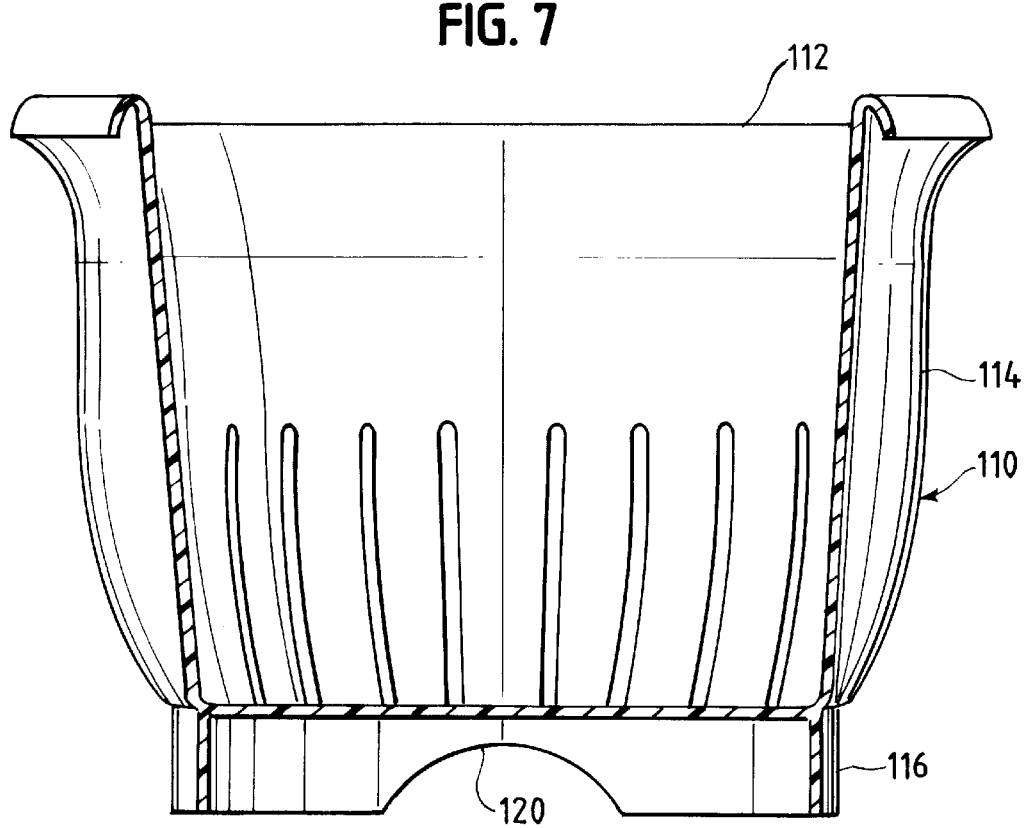
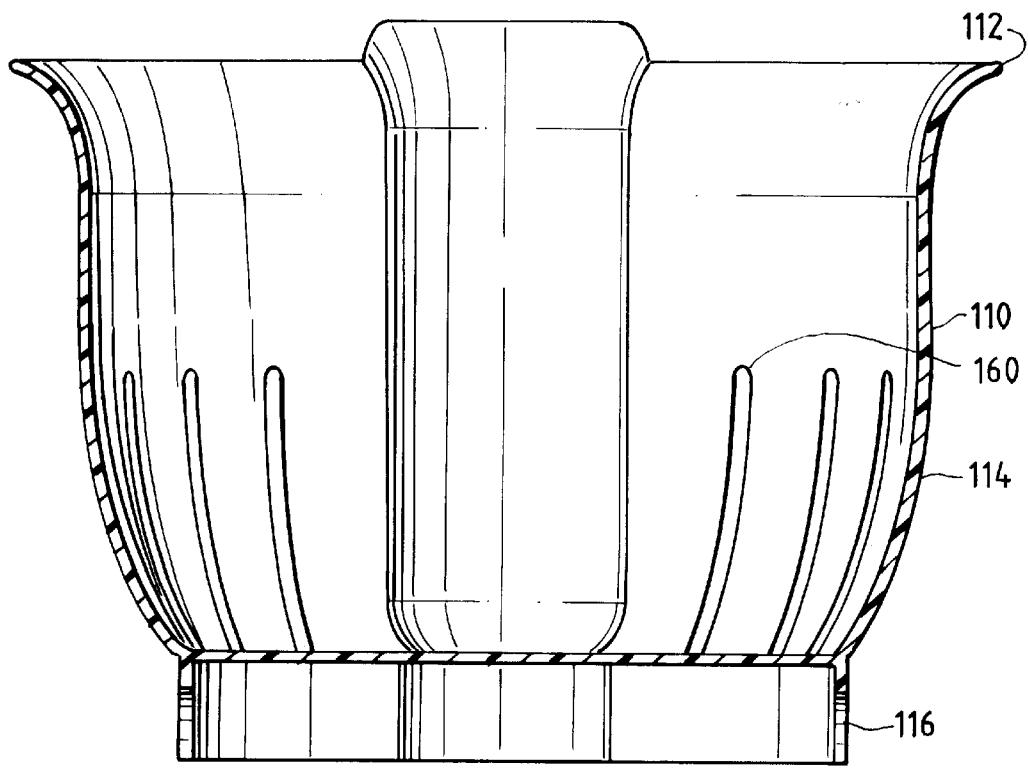
FIG. 8

CONTAINER SYSTEM INCLUDING A COLANDER

CROSS REFERENCE TO RELATED APPLICATIONS

The present invention is related to U.S. patent application Ser. No. 08/273,957 invented by Andres, et al., filed on Jul. 12, 1994, entitled, "Double Seal Container", now U.S. Pat. No. 5,769,229.

FIELD OF THE INVENTION

The present invention relates generally to a container system comprised of a lid and a container unit. More particularly, the present invention relates to a container system for use in food preparation and storage applications. Still further, the present invention is related to a container system which can be utilized in microwave steam cooking applications.

BACKGROUND OF THE INVENTION

Container systems are used in a wide variety of food preparation and storage applications. For example, food container systems can be utilized in microwave cooking applications. In one such application, a container system can operate as a microwave steamer.

The microwave steamer typically includes a container, a resealable lid, and a foodstuff utensil, such as, a colander. The colander is removable from the container and fits within the container when the lid closes the container. The lid often includes an aperture covered by a vent cap. The colander generally includes holes which allow vapor or steam to pass through the colander and which allow liquid to drain out of the colander. The vapor or steam can eventually exit the container system through the lid aperture when the vent cap is open.

In operation, foodstuffs, such as, rice or shelled corn, can be placed in the colander for cooking within the container system. Alternatively, pastas, other vegetables, or any type of food may be cooked within the container system. The colander which is at least partially filled with foodstuffs, is placed in the container. The container is at least partially filled with water or other liquid. Once the colander and container are appropriately filled, the lid is placed over the container.

The container system is then placed in a microwave oven or other heating appliance where the foodstuffs are cooked. The foodstuffs can be effectively cooked or reheated by hot steam, vapor, or liquid in the container system. After cooking, the vent cap can remain open to allow excess steam or vapor to escape. Alternatively, the vent cap can be closed or opened during the cooking operation. The lid is removed from the container so the colander can be lifted from the container. The foodstuffs are removed from the colander for eventual consumption.

Prior art microwave steamers suffer from several deficiencies. First, the utensil (e.g., colander) for holding the foodstuffs can trap pressurized vapor or excess steam between it and the container, especially when the diameter of the utensil and the container are approximately the same. Additionally, the top rims of conventional colanders often include a flange or groove between the top rim and the side wall. The flange or groove tends to trap steam or other hot vapor between the top rim of the colander and the container. The trapped steam can scald the user if the colander is improperly removed from the container. Furthermore, the flange or groove can trap liquid or food particles, thereby making cleaning more difficult.

Second, prior art microwave steamers have required colanders with a pair of separate or discrete handles for lifting the colander out of the container. Some colanders use "water bucket" style handles which must be attached to the colander in a separate manufacturing step. The handles are additional components which require additional tooling and which add to the cost of the colander.

Third, the opening beneath the vent cap on the lid of conventional microwave steamers can be susceptible to the spattering of liquids and foodstuffs cooked within the container system. During the cooking operation, the liquids and foodstuffs can be accelerated out of the unprotected opening if the vent cap is open.

Thus, there is a need for a container system which is optimized for use as a microwave steamer. Further, there is a need for a container system which includes a colander optimized for use in a microwave steamer. Further still, there is a need for a colander which includes efficiently manufactured handles. Even further still, there is a need for a container system with a vented lid which is not susceptible to the spattering of liquids from the container during the cooking operation.

SUMMARY OF THE INVENTION

The present invention relates to a container system for use in cooking applications. The container system includes a container having an opening, a lid configured to sealably engage the opening, and a colander sized to fit through the opening. The lid is also configured to close the container. The colander fits within the container when the lid closes the container, and the colander has a top rim. The top rim includes a plurality of integral recessed hand grips. The recessed hand grips serve as a plurality of vents for relieving gases from under the top rim of the colander.

The present invention further relates to a colander for use in a container system utilized in cooking applications. The container system includes a container having an opening and a lid configured to engage the opening. The colander includes a top rim sized to fit through the opening of the containers a side wall having a top end and a bottom end, and a bottom. The top rim of the colander includes a plurality of integral recessed hand grips. The recessed hand grips serve as a plurality of vents for relieving gases from under the colander. The top end of the side wall is integral with the top rim, and the bottom end of the side wall is integral with the bottom of the colander.

The present invention still further relates to a container system for use in cooking applications. The container system includes a container having an opening, a lid, and a cooking utensil. The lid is configured to sealably engage the opening and to close the container. The cooking utensil is sized to fit through the opening and within the container when the lid closes the container. The lid has a vent opening and a vent cover. The vent opening is covered by a grate. The vent cover releasably seals the vent opening.

According to one exemplary aspect of the present invention, the container system is utilized as a microwave steamer. The steamer includes a utensil, such as, a tray or a colander, for holding foodstuffs. The steamer also includes a vented lid. The vent opening of the lid includes a grate or baffle to control the spattering of liquids and foodstuffs. The grate also allows the contents of the system to be strained when liquid is poured from the system (e.g., the foodstuff, such as corn, would stay in the container while liquid would drain out).

According to another exemplary aspect of the present invention, the exterior surface of the side wall of the colander is predominantly smooth and vertical to prevent vapor from being trapped between the outer rim of the colander and the container. The colander includes integral handles which are designed to relieve excess steam or pressure trapped between the colander and the container. The handles are preferably recessed hand grips. Recessed portions associated with the hand grips extend downward along the side wall of the colander. The recessed handgrips also simplify tooling, inventory, and assembly for the container system.

According to yet another exemplary aspect of the present invention, the colander has slot-like openings (longitudinal slots) in the side wall of the colander and apertures in the bottom of the colander. The longitudinal slots allow even steam penetration for foodstuffs within the colander as well as provide fast draining when liquid is removed from the colander. The slots also have an aesthetic advantage in that they allow for a more solid and elegant bowl-like shape. The slot openings also eliminate the required tooling needed for complex and expensive slides and cams. The apertures in the bottom are designed small enough and few enough in number such that small foodstuffs, such as, rice and corn, do not fall through them. The shape of the openings is round and smooth for easy cleaning.

BRIEF DESCRIPTION OF THE DRAWINGS

The invention will be further described with reference to the accompanying drawings, wherein like numerals denote like elements:

FIG. 7 is a cross-sectional view along lines 7—7 of the colander illustrated in FIG. 5;

FIG. 8 is a cross-sectional view along lines 8—8 of the colander illustrated in FIG. 5;

DETAILED DESCRIPTION OF PREFERRED EXEMPLARY EMBODIMENT

Figure 1:
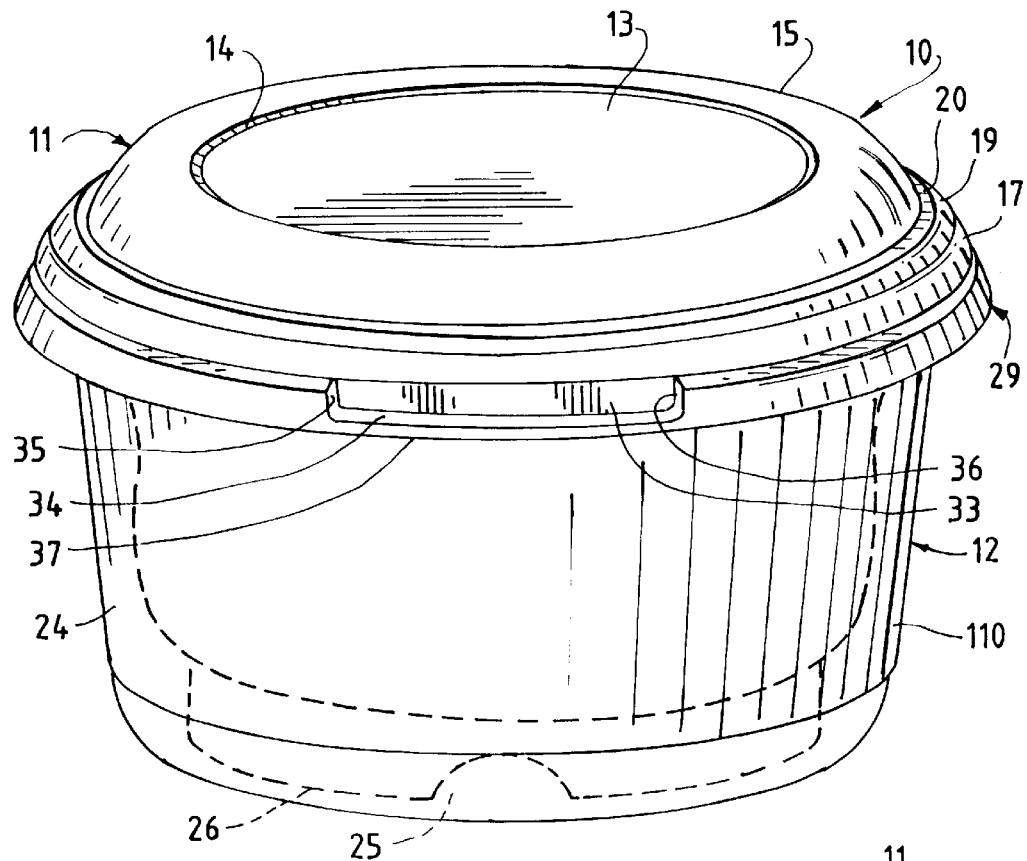
FIG. 1 is a perspective of a first exemplary embodiment of the present invention as embodied in a round container system, including a colander shown in dashed lines.
Figure 2:
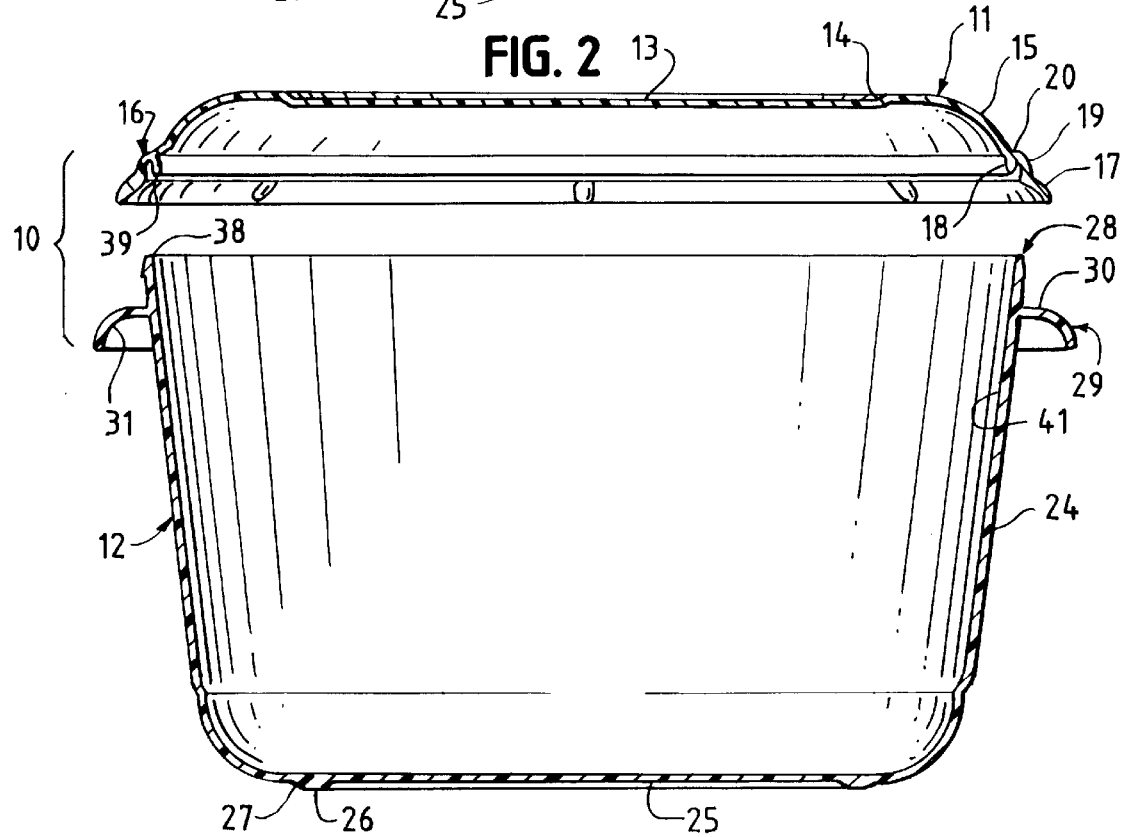
FIG. 2 is an exploded section view of the round container system of FIG. 1 without the colander.
Figure 3:
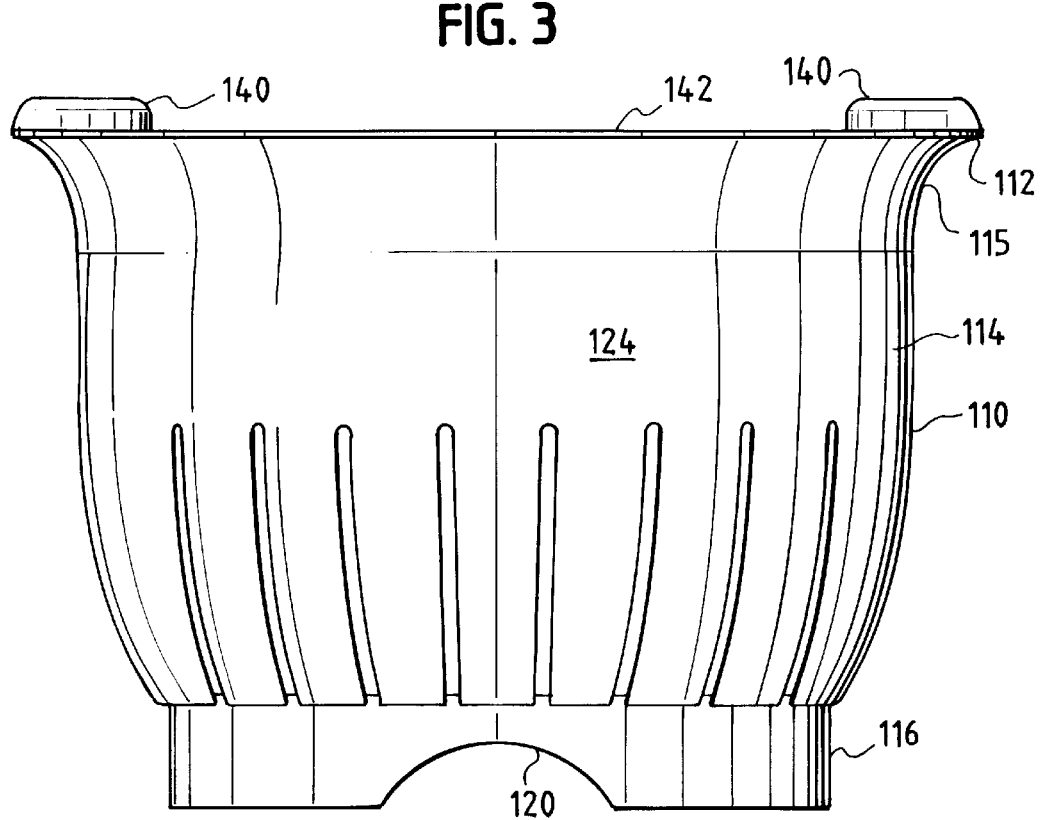
FIG. 3 is a first side view of the colander illustrated in FIG. 1 in accordance with a second exemplary embodiment of the present invention.

With reference to FIGS. 1 and 2, container system 10 includes a lid 11, a colander 110 (dashed lines), and a container 12. Lid 11 has a central depression 13, which is bounded by an upwardly and outwardly inclined rim 14 which, in turn, melds into a circular crown portion 15. The lower, radially outermost portion of crown portion 15 melds into a flange area 16 (FIG. 2), which then melds into a circular, outwardly and downwardly curved lip 17. An inner lid flange 18 (FIG. 2) and an outer lid flange 19 are, in effect, connected by a hinge area 20.

Container 12 includes an upwardly and slightly outwardly inclined circular side wall 24 which is integral with or melds into a bottom wall 25. A circular ridge 26 is formed on the outside bottom surface of bottom wall 25. Ridge 26 has an outer, upwardly inclined surface 27 (FIG. 2) which preferably matches the slope of the rim 14 in the lid 11. The diameter of the ridge 26 is no greater than, and most preferably equal to, the diameter of the central depression 13 of the lid 11. As such, when in use, two container assemblies of the size illustrated in FIGS. 1 and 2 may be stacked one upon the other in a very stable condition.

The upper end of side wall 24 terminates in a rim 28 (FIG. 2) which will be described in detail hereafter. A lifting flange 29 is used for grasping and lifting container system 10, or just container 12. Flange 29 includes an upper generally horizontally oriented portion 30 which terminates at its outer periphery in a down-turned portion 31 (FIG. 2). Flange 29 has at least one or two downwardly stepped portions 33, each of which includes a base portion 34 (FIG. 1). The vertically open space between the bottom of lip 17 of lid 11 and base portion 34 of lifting flange 29 forms an opening into which the fingertips of a user may be inserted to disassemble lid 11 from container 12 when both are in the assembled condition (FIG. 1). Base portion 34 is defined by end vertical wall portions 35 and 36, each of which is spaced any desired distance apart (e.g., about three inches) which is ample to enable a user to insert three or four fingertips. Preferably, base portion 34 is spaced 180 degrees from another base portion 34 on container 12. Alternatively, portions 35 and 36 can be spaced apart by the width of one finger tip.

Container rim 28 (FIG. 2) at the upper end of the side wall 24 is specially contoured so as to cooperate with lid 11 to effect a double seal utilizing a mechanical locking action. An upper edge 38 is rounded for the purpose of closely conforming to a bight 39 formed between inner flange 18 and outer flange 19 beneath hinge area 20 of lid 11. However, the lower portion of the approximate inner half of the rounded upper edge 38 projects radially inwardly beyond interior surface 41 of side wall 24, thereby creating, in effect, a slight internal bulge at the upper end of side wall 24. The upper end portion of rim 28 is thicker relative to the thickness of wall 24 beneath flange 29. Furthermore, the horizontal thickness of rime 28 increases for a short distance downwardly from upper edge 38.

Lid 11 and container 12 of container system 10 can be configured in a variety of fashions to provide a resealable container. For example, double seals or single seals could be utilized. Additionally, the seals associated with lid 11 and container 12 can be configured to snap when in sealing engagement and to self-align when lid 11 is placed on top of container 12. Also, latches, fasteners, or other sealing devices can be utilized to couple lid 11 to container 12. The particular interface between lid 11 and container 12 is not shown in a limiting fashion.

With reference to FIG. 1, container system 10 includes colander 110 (shown in dashed lines). Colander 110 can be replaced by a food tray, a foodstuff holding device, or other utensil which can fit within container 12. Colander 110 may be utilized to hold a variety of foodstuffs, including rice, shelled corn, pasta, vegetables, or any consumables. Container 12 is preferably a transparent plastic. Colander 110 and lid 11 can be an opaque plastic.

Figure 4:
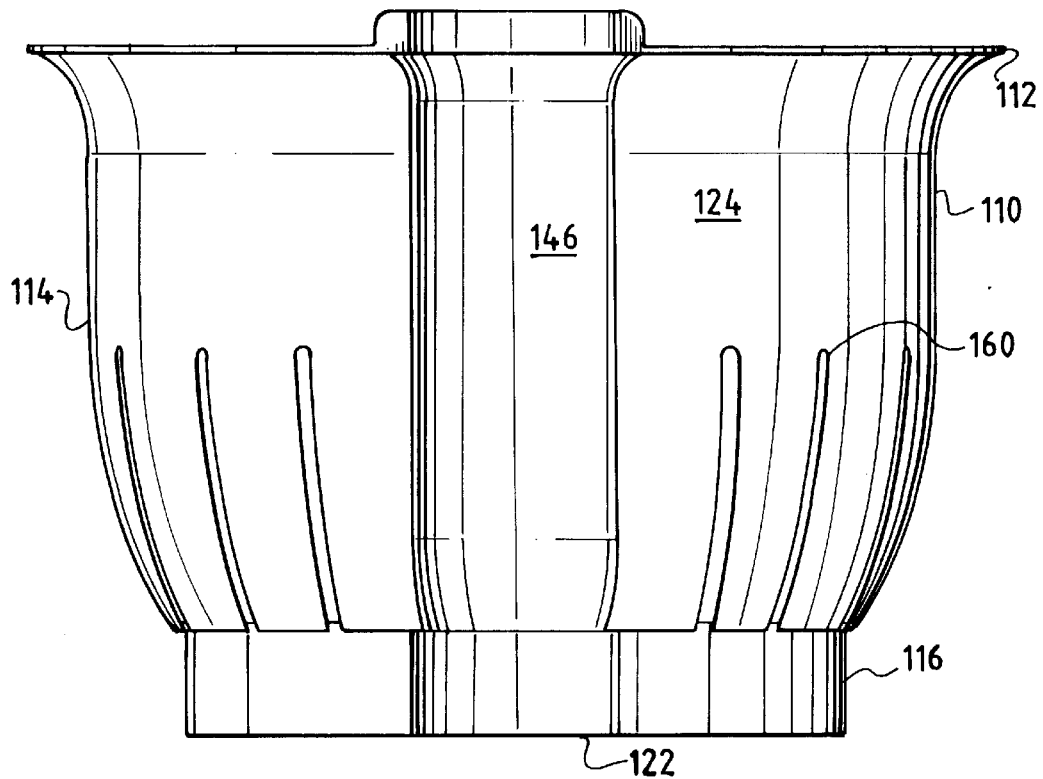
FIG. 4 is a second side view of the colander illustrated in FIG. 1, showing integral hand grips on a top rim of the colander.
Figure 5:
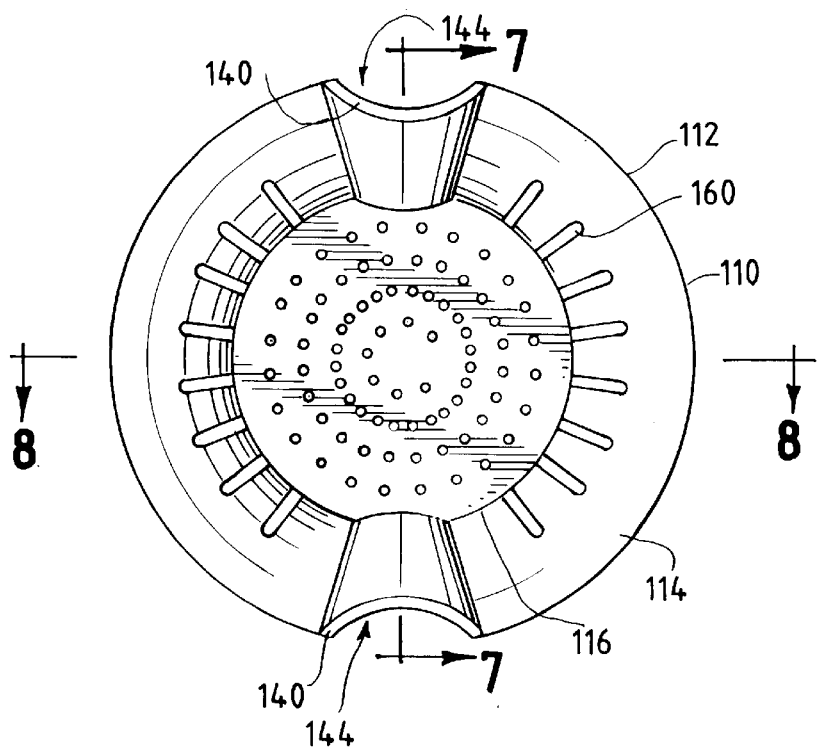
FIG. 5 is a top view of the colander illustrated in FIG. 1.
Figure 6:
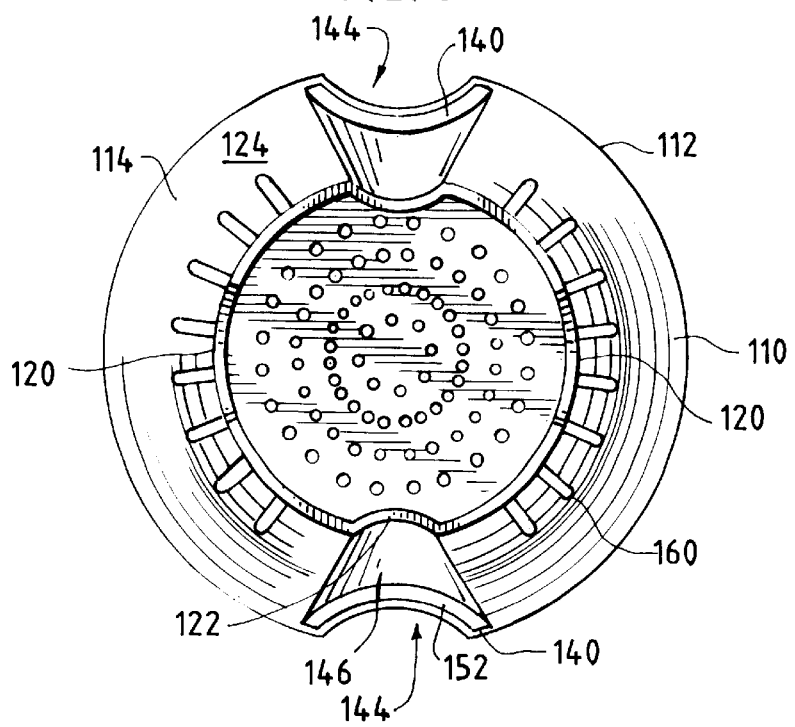
FIG. 6 is a bottom view of the colander illustrated in FIG. 1.

With reference to FIGS. 1 and 3–8, colander 110 is described in greater detail below. In FIGS. 3–8, colander 110 is preferably comprised of a top rim 112, a generally circular side wall 114, and a bottom 116. A top end of circular side wall 114 melds into or is integral with top rim 112, and a bottom end of circular side wall 114 melds into or is integral with bottom 116. Bottom 116 is preferably a circular cylinder, including a cutaway portion 120 (FIG. 3) and a recessed portion 122 (FIG. 4). Cutaway portion 120 allows vapor or steam to escape from beneath bottom 116 of colander 110 and to travel to an adjacent exterior surface 124 of side wall 114.

Bottom 116 preferably raises the bottom end of circular sidewall 114 away from the bottom of container 12. Washed vegetables or fruits are thus isolated from the water which was used to wash them. The water resides in the bottom of container 12 and away from the foodstuffs in colander 110. This allows foodstuffs to be washed and immediately stored within system 10 without requiring removal and replacement of colander 110 or container 12 and without allowing the liquid to contact the foodstuff during storage. For example, system 10 can be used as a lettuce keeper.

Side wall 114 preferably has a curvilinear shape (e.g., a slightly S-shaped contour) which terminates at an outwardly extending curved portion 115 adjacent top rim 112. Top rim 112 is preferably a closed or smooth rim which does not include a groove or perpendicular flange. (FIG. 8) The smooth surface of the interface between top rim 112 and sidewall 114 allows gases and steam to more easily escape from beneath top rim 112. The shape of colander 110 can take a variety of forms, including rectangular, oval, or other geometries.

Top rim 112 preferably includes integrally formed hand grips or handles 140. Handles 140 preferably extend above a top portion 142 of top rim 112. Handles 140 define cutaway or recessed portions 144 (FIGS. 5 and 6) which, in turn, define cutaway or recessed portions 146 on side wall 114. Furthermore, recessed portions 146 then define the portions 122 associated with bottom 116. Recessed portions 146 are preferably integral with handles 140.

Handles 140 include grooves 152 (FIG. 6) which are disposed between recessed portions 146 of sidewall 114 and handles 140 on top rim 112. Grooves 152 of handles 140 provide an edge associated with handle 140 which can be easily grabbed or otherwise held when removing colander 110 from container 12. Although grooves 152 can retain other vapor, recessed portions 144, 146, and 122 provide an integral vent for allowing vapor to escape from colander 110. Thus, handles 140 define a vent region on bottom 116, side wall 114, and top rim 112.

Preferably, handles 140 are semicircular, having a diameter of approximately 1.75 inches and a circumference of approximately 150 degrees of an arc. Handles 140 extend approximately 0.25 inches above surface 142 of top rim 112. Container 12 preferably has a diameter of approximately 7.5 inches. Colander 110 preferably has a diameter of approximately 5.5 inches at a center point of handles 140. Colander 110 preferably has a diameter of approximately 4.75 inches at bottom 116. Bottom 116 is approximately 0.75 inches high. Colander 110 is preferably approximately 5.25 inches tall from a bottom of bottom 116 to a top of handle 140. Container 12 is preferably approximately 5.75 inches high.

Colander 110 includes 16 longitudinal slots 160 that are disposed about the periphery of side wall 114. Slots 160 are approximately one-eighth of an inch wide and approximately 2.0 inches high. Slots 160 provide a dual function of allowing both better steam penetration and faster water drainage than conventional holes. Also, slots 160 provide a more solid bowl-type appearance for colander 110.

Bottom 116 also includes a number of apertures 162 disposed in a circular pattern. Apertures 162 preferably have smooth edges and a diameter of approximately 0.125 inches. Slots 160 and apertures 162 are not stepped or angular, thereby making manufacturing and cleaning of colander 110 easier.

Figure 9:
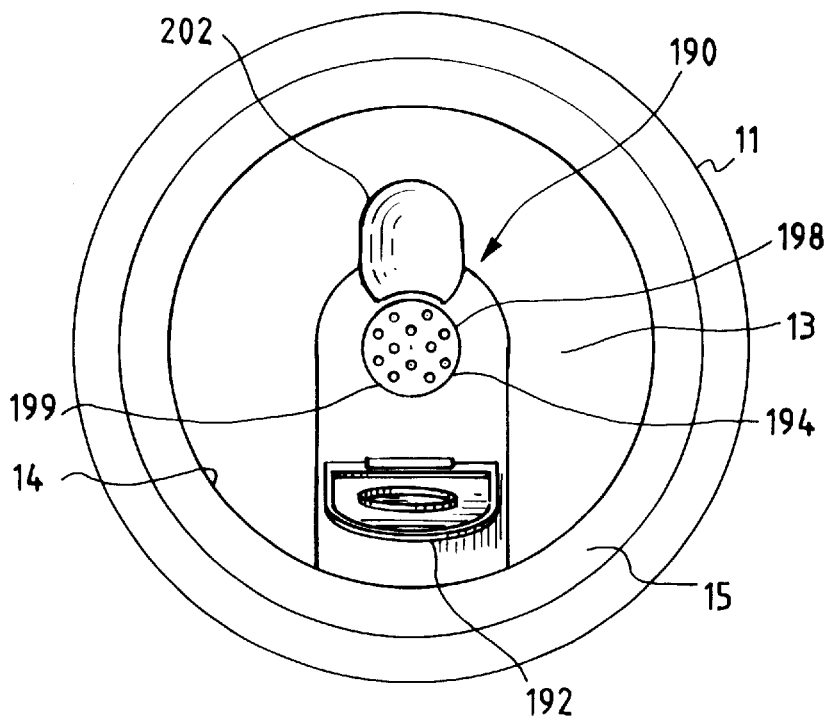
FIG. 9 is a top plan view of a lid for use in the container system illustrated in FIG. 1, having a vent cap in an open position in accordance with a third exemplary embodiment of the present invention.
Figure 10:
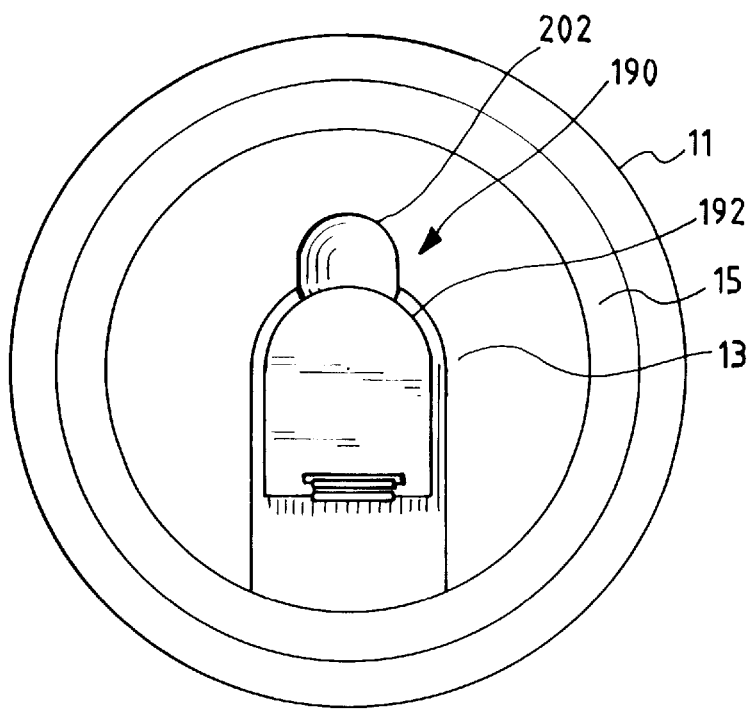
FIG. 10 is a top plan view of the lid illustrated in FIG. 9, having the vent cap in a closed position.

With references to FIGS. 9 and 10, lid 11 is configured with a vent cap apparatus 190. Vent cap apparatus 190 includes a vent cap 192 and a screened or baffled aperture 194. Baffled aperture 194 includes 12 apertures 198 arranged in a cross-shaped form. Aperture 194 can be a baffled aperture, a grated aperture, or other aperture. Vent cap 192 is sealably engaged with a circumference 199 of aperture 194. A recess 202 disposed in lid 11 allows a finger to be placed underneath cap 192 for easy opening of cap 192. Baffled aperture 194 prevents splattering of liquids when cap 192 is released from circumference 199. Recess 202 can also assist in pouring liquid from system 10 when lid 11 is engaged to container 12. Baffled aperture 194 can strain the liquid as it is poured from system 10. Without vent cap apparatus 190, lid 11 would have to be removed or loosened during heating, steaming, and reheating applications.

Figure 11:
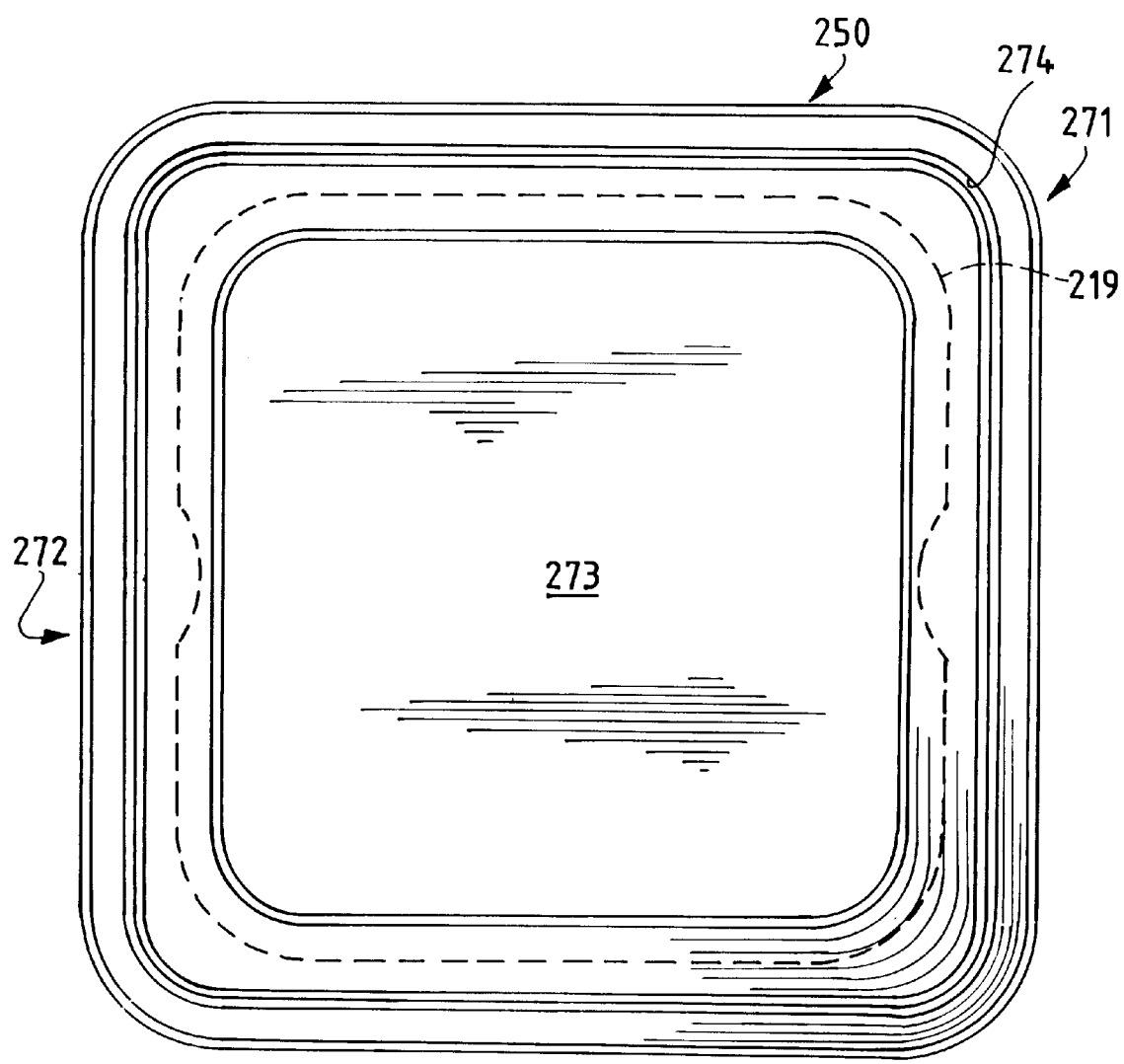
FIG. 11 is the top plan view of a fourth exemplary embodiment of the present invention as embodied in a rectangular container system, including a colander shown in phantom lines.

With reference to FIG. 11, a rectangular container system 250, in this instance a square container system, is substantially similar to the system 10 already described with reference to FIGS. 1–10. System 250 includes a lid 271 and a container 272. System 250 also includes a rectangular colander 219 (dashed lines) similar to colander 110 (FIG. 1). Lid 271 includes a central depression 273 and an upwardly and outwardly inclined rim surface 274 which surrounds and defines the central depression 273.

With reference to FIGS. 1–10, the operation of system 10 is described below. System 10 is operated by placing foodstuffs in colander 110. Container 12 is partially filled with a liquid, such as, water. Colander 110 and its contents are then placed in the liquid inside container 12. With lid 11 loosely covering container 12, system 10 is placed in a microwave and the liquid is heated. Alternatively, vent cap apparatus 190 can be opened before system 10 is placed in the microwave. Steam and vapor from the heated liquid on the bottom of container 12 penetrate between slots 160 and apertures 162 and heat foodstuffs within colander 110. After heating, lid 11 is removed from container 12. Vapor and steam are allowed to dissipate via recessed portions 144, 146 and 122 from container 12. Colander 110 is then removed from container 112 by grabbing handles 140 and gently lifting colander 110 out of container 12. Cap 192 may be open or closed when heating liquid in container 12.

Lid 11 and container 12 can be utilized with or without colander 110. Lid 11 and container 12 make an ideal microwave cooking and reheating device due to vent cap apparatus 190. Colander 110 can also be utilized without lid 11 and container 12. The geometry of lid 11, container 12, and colander 110 allow efficient storing of system 10.

It is understood that the above description is of preferred exemplary embodiments of the present invention. The apparatus and method of the invention are not limited to the specific forms shown. For example, although plastic materials are suggested and a circular or rectangular shape is shown, other materials and geometries can be utilized. Various modifications may be vague to the details of the disclosure without departing from the spirit of the invention which is defined in the appended claims.

What is claimed is:

1. A container system for use in cooking applications, comprising:

a container having an opening;

a lid configured to sealably engage the opening and to close the container; and a colander sized to fit through the opening and within the container when the lid closes the container, the colander having a side wall terminating at a top rim, the side wall including a plurality of integral recessed portions terminating at the top rim as hand grips, the recessed portions serving as a plurality of vents for relieving gases from under the top rim of the colander.

2. The container system of claim 1 wherein the lid includes a vent opening and a lid cape, the lid cap releasably sealing the vent opening, wherein a grate covers the vent opening.

3. The container system of claim 1 wherein the colander further includes a bottom, the side wall being disposed between the top rim and the bottom, wherein the bottom includes recessed portions corresponding to the recessed portions of the side wall.

4. The container system of claim 1 wherein the colander further includes a bottom the side wall being disposed between the top rim and the bottom, wherein the side wall has a plurality of longitudinal slots.

5. The container system of claim 4 wherein the bottom has a plurality of apertures.

6. The container system of claim 1 wherein the recessed hand grips are disposed above the top rim.

7. The container system of claim 6 wherein the recessed handgrips are semicircular.

8. The container system of claim 7 wherein the top rim is substantially circular, and the hand grips are disposed 180 degrees from each other.

9. A container system for use in cooking applications, comprising:

a container having an opening;

a lid configured to sealably engage the opening and to close the container; and a colander sized to fit through the opening and within the container when the lid closes the container, the colander having a top rim including a plurality of integral recessed hand grips, the recessed hand grips serving as a plurality of vents for relieving gases from under the top rim of the colander wherein the lid has a vent opening and a vent cover, the vent opening being covered by a grate, the vent cover releasably sealing the vent opening.

10. The container system of claim 9 wherein the grate is permanently secured over the vent opening.

11. The container system of claim 10 wherein the lid includes a recess disposed adjacent the vent opening.

12. The container system of claim 11 wherein the vent cover partially covers the recess when closing the vent opening.

13. The container system of claim 11 wherein the grate is defined by circular apertures.

14. A container system, for use in cooking applications and including a container having an opening and a lid configured to engage the opening, the container system further comprising a colander having a side wall and a top rim, the colander being sized to fit through the opening of the container and including a plurality of integral recessed hand grips, the recessed hand grips being integral with recessed portions in the side wall, the recessed portions serving as a plurality of vents for relieving gases from under the colander, the side wall having a top end and a bottom end, the top end being integral with the top rim and a bottom integral with the bottom end of the side wall.

15. The container system of claim 14 wherein the recessed hand grips extend above the top rim.

16. The container system of claim 15 wherein the side wall has a plurality of longitudinal slots.

17. The container system of claim 16 wherein the bottom has a plurality of apertures.

18. The container system of claim 14 wherein the recessed hand grips are disposed above a plane intersecting the top rim.

19. The container system of claim 14 wherein the interface between the top end of the side wall and the top rim is substantially smooth on an exterior surface of the colander.

20. The container system of claim 19 wherein a groove is disposed between the recessed hand grips and the top end of the side wall on the exterior surface of the colander.

* * * * *